United States Patent Office 2,910,758
Patented Nov. 3, 1959

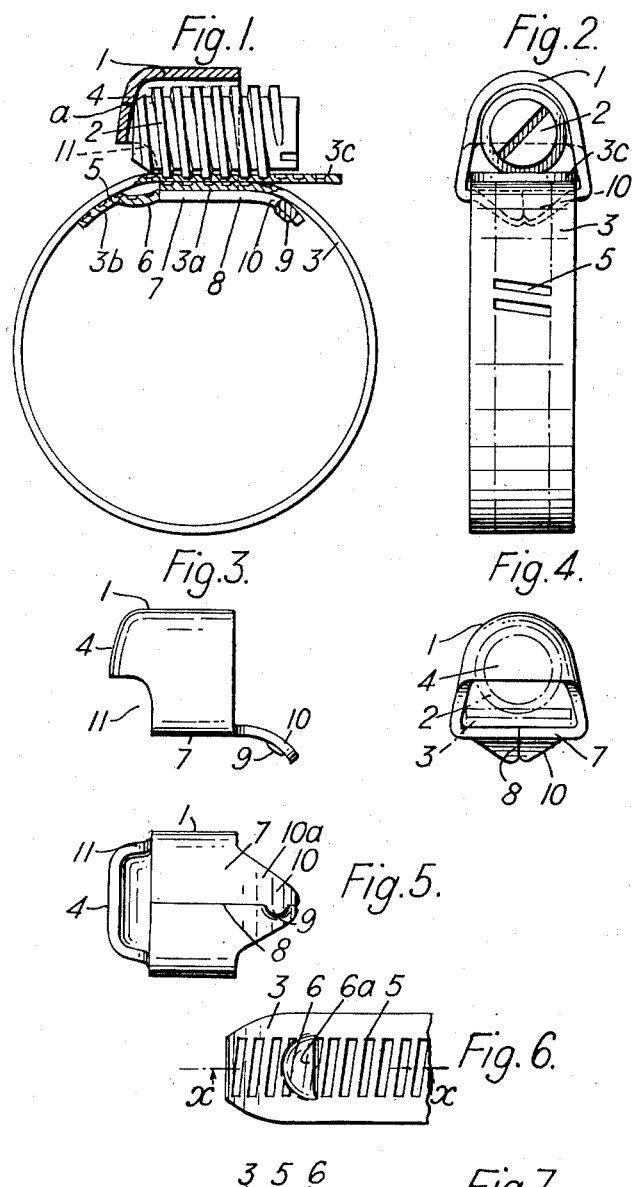

2,910,758

HOSE OR LIKE CLIPS

Evan Meirion Arthur, West Heath, Birmingham, England

Application May 8, 1958, Serial No. 734,014

1 Claim. (Cl. 24—274)

This invention relates to hose or like clips of the type in which a flexible band carries at one end a housing in which a screw threaded or worm spindle is rotatably mounted to screw engage worm engaging grooves or the like in the other end portion of the band which is guided through the housing, and this invention has for its object a simplified construction. A further object is to press the worm spindle into engagement with the worm grooves in the flexible band in proportion with the force required to contract the band.

Referring to the drawings:

Figure 1 is a side elevation of a hose or like clip constructed according to this invention.

Figure 2 is an end elevation of Figure 1.

Figure 3 is a side elevation of a housing for the screwed spindle.

Figure 4 is an end view of Figure 3.

Figure 5 is a plan of Figure 3.

Figure 6 is a face view of the inner end of the clip band, and

Figure 7 is a section on line X—X of Figure 6.

According to a convenient embodiment of this invention, a housing 1 for a screw threaded or worm spindle 2 is in cross-section semi-circular at the top and is enlarged at the bottom to receive the band 3. The outer or rear end of the housing is closed to form an abutment wall 4 for the end of a screwed or worm spindle, the bottom portion of the housing below the wall 4 being open at 11 for the passage of the band 3. The flexible strip metal band 3 is conveniently cut from a length of strip with worm engaging grooves 5 therein for engaging the screw threaded spindle 2 and the front end of the band has a stop 6 thereon to form a shoulder 6a against which the bottom wall of the housing 1 is adapted to bear. The stop may be pierced and pressed from the band. Any other form of stop may be provided. The bottom wall 7 of the housing is flat and the inner end 3a of the band held stationary in the bottom of the housing is also flat, the front portion 3b projecting from the housing and beyond the stop thereon being curved when assembled. The screwed or worm spindle 2 is cylindrical for the effective portion of its length and the worm on the cylindrical body is rotatably mounted in the housing 1 and the end of the spindle is adapted to bed against the closed end 4 of the housing to take end thrust when the spindle is turned to contact the band 3 on the hose. The outer end 3c of the band is passed into the housing through the opening 11 and is constrained to lie flat, whilst in engagement with the screwed spindle 2 so that all the threads of the spindle can engage the band 3 in the housing 1. The screwed spindle 2 may be tapered for a short distance at the leading end to facilitate assembling the end 3c of the band into the housing and in engagement with the spindle 2. The screwed spindle is free in the housing between the top and side walls and the flexible band 3 to adjust itself and when the band 3 is being contracted, the pressure on the worm grooves 5 in the band pressing the end of the spindle on the abutment 4 form a leverage tending to fulcrum the screwed spindle and press the same along its full length on the band. The closed end wall 4 of the housing 1 is inclined outwardly from the top portion of the housing to the bottom portion of the housing to form an inclined plane as shown so that when the spindle is contracting the band 3, the spindle will fulcrum about its front end bearing on the wall 4 at *a* on the outer side of the axis of the worm spindle 2 and diametrically opposite the engaging side of the worm to press the spindle into engagement with the band 3, the forward end of the spindle also sliding down the inclined wall 4. This fulcrum action of the spindle 2 is a valuable feature, as the greater the endwise pressure on the screwed or worm spindle, the greater will be the force causing the spindle 2 to fulcrum and slide down the wall 4 and press the screw threads in the grooves 5 so that the tip of the teeth press on the bottom of the grooves 5. As the screwed spindle engages the band along the full length of the housing and also at the root of the worm on spindle 2, the length of the housing can be short, so that the same size of housing can be used for clips engaging small and large diameters of hose pipe. A housing of small length can be used with small hose or like clips and a large diameter screwed spindle 2 can also be used without requiring an undue large housing. As, in this embodiment, the housing and band are not permanently fixed together, a housing can be assembled on any length of band. The end of the screwed spindle may have a cross cut and the end may also be in the shape of a nut.

The housing may be produced by a drawing process or pressed up from a metal blank and the edges 8 of the turned over portions of the blank on the underside of the housing form a butt joint. The bottom of the housing is extended to form the curved lip 10 and one half of the curved lip 10a on one side of the lip has a small lug 9 of metal which overlaps in the length of the meeting edges of the lip and an electrode of a welding machine is applied thereto which melts the metal and forms a smooth surface and the joint. The lip 10 tapers to the tip to facilitate such tip curving under clamping pressure on small diameter tubes when the hose clip is clamped in position.

By this invention therefore a simple form of clip is obtained which is cheap to manufacture and which can withstand considerable strain.

Having thus described the invention, what is claimed as new and desired to be secured by Letters Patent is:

In a hose clip, a flexible band having worm grooves therein which are rectangular in cross-section and of less depth than the thickness of the band, a housing anchored on one end of said band, a worm spindle having a worm in the form of a thread rectangular in cross-section on a cylindrical body and being loosely accommodated in the housing so that it is free to rotate and float laterally equally along its full length in relation to the axis of the spindle in the housing into engagement with said worm grooves in the other end portion of the band, a flat bottom on the housing for giving support to the flexible band engaged by said worm spindle, an opening in one end of the housing through which said spindle is inserted into the housing and a front wall forming an abutment on the other end of the housing which front wall inclines outwardly from the top portion of the housing to the bottom portion of the housing in the form of an inclined plane and said worm spindle having a leading end which bears against said front inclined wall solely at a place on the outer side of the axis of the worm spindle diametrically opposite the engaging side of the worm whereby operative end pressure on the worm spindle causes such spindle to be forced against the said band with the tip of the worm bearing on the bottom of said worm grooves and in driving connection with the sides of said worm grooves.

References Cited in the file of this patent

UNITED STATES PATENTS

| | | |
|---|---|---|
| 1,992,505 | Prosky | Feb. 26, 1935 |
| 2,820,276 | Clauss et al. | Jan. 21, 1958 |

FOREIGN PATENTS

| | | |
|---|---|---|
| 336,007 | France | Dec. 23, 1903 |
| 542,482 | Great Britain | Jan. 12, 1942 |
| 809,462 | France | Dec. 12, 1936 |